United States Patent

[11] 3,599,045

| | | | |
|---|---|---|---|
| [72] | Inventor | Pedro Farinas | |
| | | Cornwells Heights, Pa. | |
| [21] | Appl. No. | 863,632 | |
| [22] | Filed | Oct. 3, 1969 | |
| [45] | Patented | Aug. 10, 1971 | |
| [73] | Assignee | I-T-E Imperial Corporation | |
| | | Philadelphia, Pa. | |

[54] DISCRIMINATING FAULT INDICATION CIRCUIT
8 Claims, 3 Drawing Figs.

[52] U.S. Cl. ............................................. 317/36 TD,
   317/33 SC, 340/213 R, 340/253 A
[51] Int. Cl. ................................................ H02h 3/08,
   G08b 21/00
[50] Field of Search ....................................... 317/36 TD,
   33 SC, 31, 33, 22; 340/213, 253, 248, 372, 376;
   200/56, 167, 132 R; 307/132 E, 132 M, 141.4

[56] References Cited
UNITED STATES PATENTS

| | | | | |
|---|---|---|---|---|
| 3,210,605 | 10/1965 | Jones | | 317/33 (SCR) |
| 3,225,257 | 12/1965 | Fegley | | 317/33 |
| 3,243,796 | 3/1966 | Harmon | | 317/31 X |
| 3,319,127 | 5/1967 | Zocholl et al. | | 317/36 (TD) |

*Primary Examiner*—J. D. Miller
*Assistant Examiner*—Harvey Fendelman
*Attorney*—Ostrolenk, Faber, Gerb & Soffen ABSTRACT: A mechanical indicator having a first and second indicating position determined by energization of a set coil or reset coil, respectively, is provided for each phase of a multiple phase power distribution system. Each of the phases is provided with a current-sensing circuit which delivers signals to the gate circuit of a controlled rectifier. The controlled rectifier is then fired in series with a trip coil which opens the multiphase circuit responsive to a fault on any of the phases. The set coils of each of the indicators are energized responsive to a fault in one or more of the phases being monitored to indicate that the controlled rectifier has fired, and which phase conducted fault current.

INVENTOR.
PEDRO FARINAS

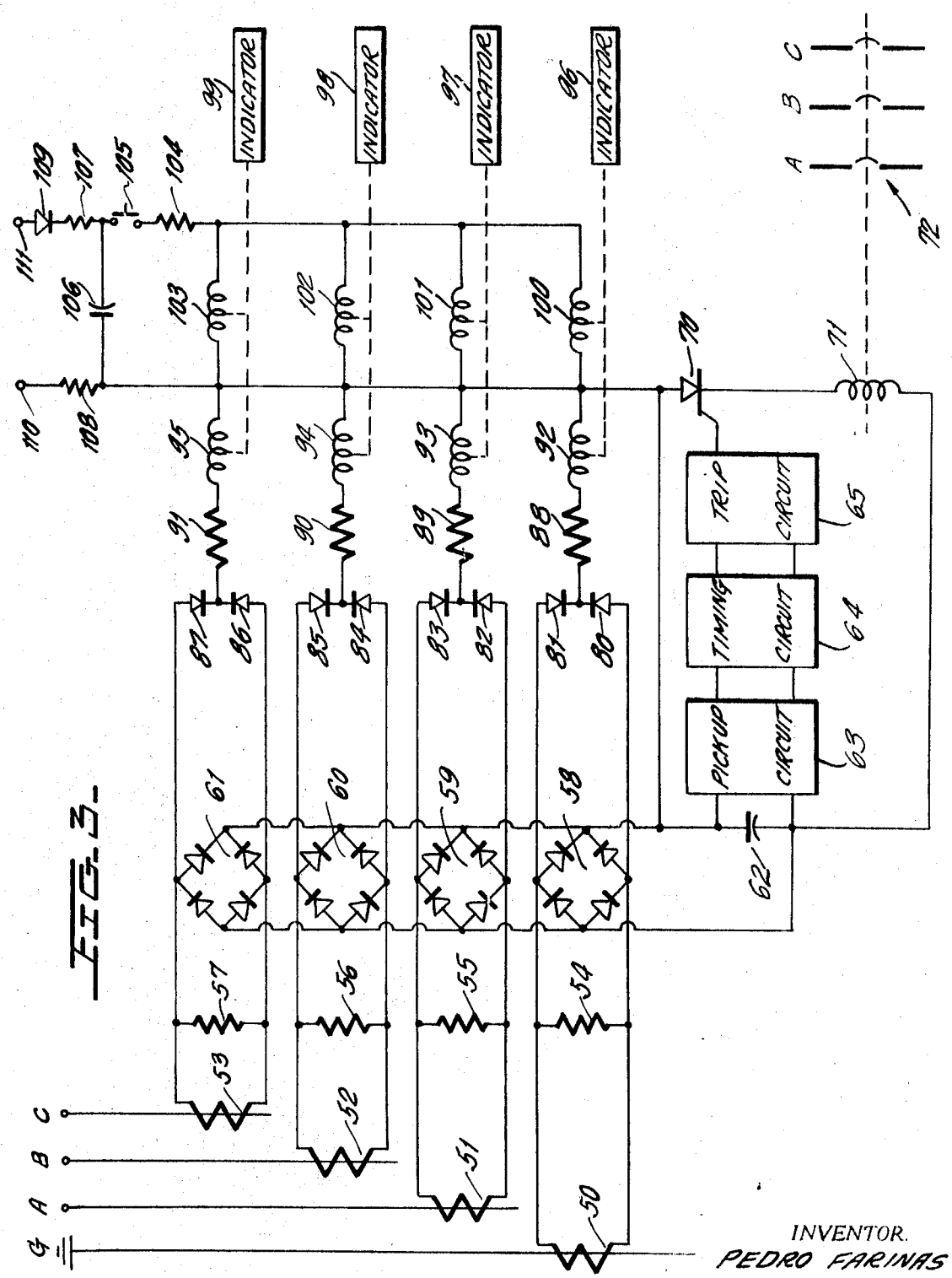

DISCRIMINATING FAULT INDICATION CIRCUIT

RELATED PATENTS AND APPLICATIONS

The circuit of the present invention is useful in connection with solid state relay circuits of the type shown in U.S. Pat. No. 3,319,127 to Zocholl et al., entitled "Static Overcurrent Relay," and is an improvement of the devices shown in copending application Ser. No. 673,716, in the name of Zocholl, entitled "Drop Annunciator with Pivotally-Mounted Target Indicator Bearing A Permanent Magnet", filed Oct. 9, 1967, now U.S. Pat. No. 3,530,454, and copending application Ser. No. 826,932, in the name of Zocholl, entitled "Operation Indicator Circuit for Static Overcurrent Relays," filed May 22, 1969, both of which are assigned to the assignee of the present invention.

FIELD OF INVENTION

This invention relates to indicator circuits, and more particularly relates to a novel circuit arrangement for use in connection with a solid state relay to indicate the firing of a solid state device and to indicate which of a plural number of phases was subjected to fault conditions.

PRIOR ART

Fault indicator circuits commonly use a lamp-type indicator which requires periodic maintenance and wherein loss of control power results in a loss of indication. To avoid this problem, indicators have been constructed which do not require continuous maintenance and continuous control power where these indicators are electromagnetically operated devices of the type shown in the above noted application Ser. No. 673,716 now U.S. Pat. No. 3,530,454. Thus, a movable armature is magnetically moved between an indicating and nonindicating position and stays in its last position when control power is removed. The device can be reset by hand when desired. Devices of this type, however, are large, expensive, and are subject to malfunctioning due to shock forces.

Electromagnetic devices which are not adversely affected by reasonably high shock forces are commercially available, and are know as "electromagnetic status indicators," available from Ferrenti-Packard Electric Limited, Electronics Division, Toronto, Ontario, Canada. These devices are provided with three terminals and include a series-connected set coil and reset coil which are magnetically coupled to a visible, movable indicator member. The energization of the set coil by a relatively low-power, short-time duration signal will set the indicator in an indicating condition and the indicator will remain in this position even after deenergization of the set winding. The indicator can be reset to its nonindicating condition by energization of the reset winding and the indicator will remain in this condition even after removal of power and until energization of the set winding. For example, these windings may be set and reset at 4.2 volts DC, by a 250 milliampere pulse having a duration of only one millisecond.

Devices of this type have been adapted for indication of the conduction condition of a semiconductor device in copending application Ser. No. 826,932, noted above. This circuit, however, is a relatively complex circuit requiring sequential capacitor charging.

BRIEF SUMMARY OF INVENTION

In accordance with the present invention, electromagnetic status indicators are provided with a simplified energizing circuit whereby such devices may be used to indicate the conduction condition of a semiconductor device and further wherein the devices can be used to indicate which of a plurality of phases have led to the firing of a fault-responsive relay for a circuit interruption system.

BRIEF DESCRIPTION OF DRAWINGS

FIG. 3 illustrates the manner in which indicators of the type shown in FIG. 1 may be used in a multiphase circuit protection system for indicating the existence of a fault and for indicating the phase in which the fault existed.

DESCRIPTION OF PREFERRED EMBODIMENTS

Figure 1:
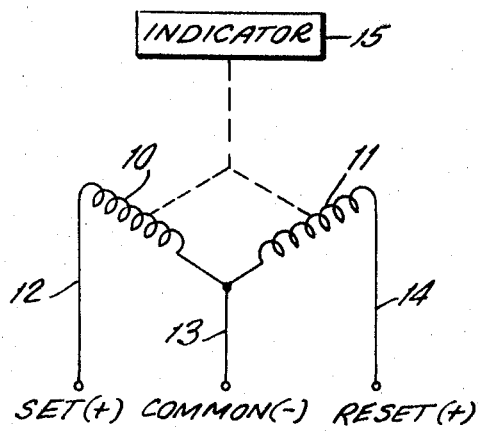
FIG. 1 schematically illustrates a typical electromagnetic status indicator which can be used in accordance with the present invention.

Referring first to FIG. 1, there is shown an electromagnetic status indicator which consists of two windings 10 and 11 which are interconnected with a set lead 12, a common lead 13 and a reset lead 14. Each of coils 10 and 11 are magnetically coupled to an indicator 15 through a suitable circuit, which will cause the indicator to move to an indicating position responsive to energization of winding 10 and to nonindicating position responsive to energization of winding 11. Moreover, once the indicator is moved to one of its indicating or nonindicating positions, it will remain in that position even after removal of power from all of conductors 12, 13 and 14 and until winding 10 or 11 is energized, which calls for the indicator to move to the other of its positions. A device of this type is commercially available from Ferranti-Packard Electric Limited, Electronics Division, Toronto, Ontario, Canada and is known as an electromagnetic status indicator. These indicators are available as shown and are also available with a respective diode in leads 12 and 14.

Figure 2:
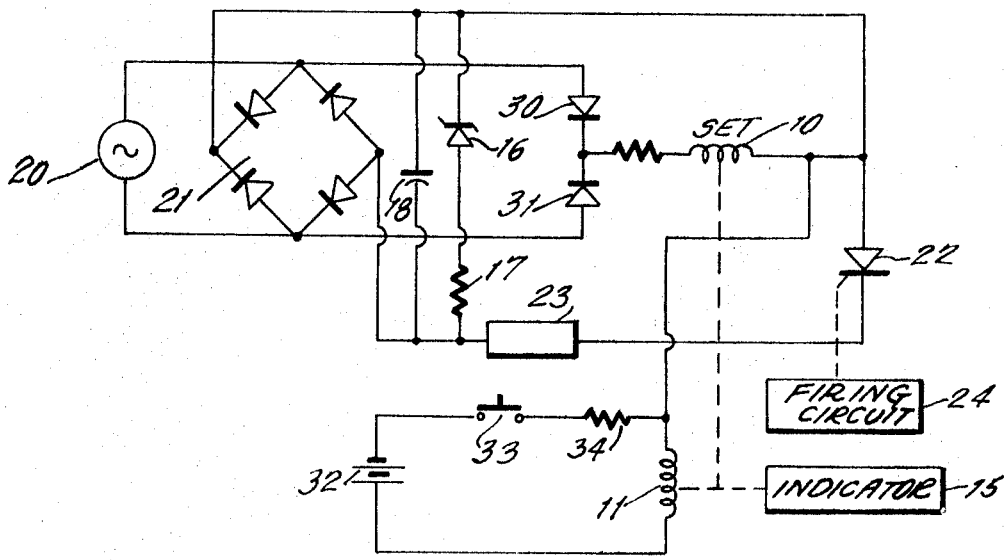
FIG. 2 is a circuit diagram in which the indicator of FIG. 1 is adapted in accordance with the invention to indicate the conduction condition of a semiconductor device.

FIG. 2 illustrates the manner in which an indicator of the type shown in FIG. 1 can be used in accordance with the present invention for indicating the conduction condition of a semiconductor device. Thus, in FIG. 2 there is illustrated a circuit in which an AC source 20 is connected to the AC input terminals of a single-phase, full-wave, bridge-connected rectifier 21. The DC terminals of rectifier 21 are then connected in closed series relation with a controlled rectifier 22 and some suitable load 23. To maintain the output of rectifier 21 constant, and to provide at least some stored energy for the circuit, the Zener diode 16 and series resistor 17 may be provided, as shown, with parallel capacitor 18. The gate lead of controlled rectifier 22 and thus the conduction thereof is controlled by some suitable firing circuit 24. It can be presumed that suitable circuitry is provided for extinguishing controlled rectifier 22 when desired.

In accordance with the invention and to indicate whether the controlled rectifier 22 has conducted, an indicator of the type shown in FIG. 1 is provided with its set coil 10 connected to the junction of the cathodes of diodes 30 and 31 while the anodes of diodes 30 and 31 are connected to the AC source 20. The reset winding 11 is then connected in closed series with a suitable reset circuit which could include a suitable DC source 32, a momentary closing reset switch 33 and a current-limiting resistor 34. The operation of the circuit of FIG. 2 is such that when controlled rectifier 22 is caused to conduct by its firing circuit 24, coil 10 will conduct at least a short pulse current, thereby moving indicator 15 to an indicating position. After the controlled rectifier 22 ceases its conduction, an operator can manually reset the indicator 15 by closing momentary switch 33, thereby energizing reset winding 11 and resetting the indicator 15. The indicator 15 will then remain in this reset condition until the controlled rectifier 22 is again fired. If desired, firing of controlled rectifier 22 can de-energize source 20. The capacitor 18 insures sufficient stored energy to fire controlled rectifier 22. After discharge of capacitor 18, controlled rectifier 22 is extinguished.

FIG. 3 illustrates the manner in which a circuit of the type shown in FIG. 2 can be adapted to a multiple fault indicating circuit using a solid state relay. Referring to FIG. 3, there is illustrated a four-wire circuit which includes the phases A, B and C and a ground conductor G. Suitable current transformers or other sensors, such as current transformers 50, 51, 52 and 53, are provided on the conductor G, and phases A, B and C, respectively. Each of the current transformers 50 to 53 are connected to suitable burden resistors 54 to 57, respectively, and to the input of respective single-phase, full-wave, bridge-connected rectifiers 58 to 61. The outputs of rectifiers 58 to 61. The outputs of rectifiers 58 to 61 are connected in parallel and are processed in the manner disclosed, for example, in U.S. Pat. No. 3,319,127. An energy storage capacitor 62 may be connected across the output of rectifiers 58 to 61. The output of capacitor 62 is then connected to a pickup circuit 63 which becomes operative only when the input voltage to the pickup 63 exceeds some predetermined magnitude which is indicative of a fault in one of the phases or the ground of the system. After a fault current has been indicated by an output from the pickup circuit, a timing circuit 64 begins to time and energizes a trip circuit 65 if the fault condition lasts some given length of time for a given fault magnitude. Thereafter, the trip circuit 65 fires controlled rectifier 70 so that the output of the rectifiers 58 to 61 is connected through controlled rectifier 70 to trip coil 71, thereby operating the circuit breaker 72 containing the phases A, B and C, mentioned above, to open the circuit. Note that energy storage capacitor 62 insures proper operation even though auxiliary power is lost when breaker 72 opens. All of the foregoing description of the protective circuit is old and well known.

In accordance with the present invention, indicators of the type shown in FIG. 1 are a adapted to indicate the fact that the controlled rectifier 70 has fired and further indicate which of one or more of the phases conducted the fault current leading to the firing of controlled rectifier 70. Thus, in accordance with the invention, diode pairs 80—81, 82—83, 84—85 and 86—87 are connected across the rectifier bridges 58 to 61, respectively. Sensitivity control resistors 88 to 91 are connected from the junction between each of the diode pairs and in series with set coils 92 to 95, respectively, which are associated with indicators 96 to 99, respectively. Obviously, coils 92 to 95 correspond to set coil 10 of FIG. 1 and indicators 96 to 99 correspond to indicator 15 of FIG. 1. The right-hand terminal of each of the set coils 92 to 95 is then connected to the anode of controlled rectifier 70 and the positive terminal of rectifiers 58 to 61. Therefore, a current path is provided through each of the set coils 92 to 95 from its respective current transformer 50 to 53 through the controlled rectifier 70 when the controlled rectifier is fired.

In accordance with the invention, the sensitivity resistors 88 to 91 are so adjusted that the pickup current required to actuate the indicator will flow only if the output voltage on one of the burden resistors 54 to 57 corresponds to at least some minimum fault value which was necessary to initiate the operation of the pickup circuit. Therefore, and assuming that phase A, for example, encounters a fault over-current condition, the output voltage of burden resistor 55 increases to above some given value so that the pickup circuit becomes operative and so that the timing circuit ultimately operates the trip circuit to fire controlled rectifier 70 and to open recloser 72. At the same time the output voltage of burden resistor 55 was sufficiently high, consistent with the adjusted resistance setting of sensitivity resistor 89, that sufficient current flows through the set coil 93 to operate indicator 97. It should be noted that if phases B and C do not see this fault current, that the current flow through their respective set coils will be insufficient to operate their respective indicators. Therefore, and in accordance with the invention, there is an indication of the fact that the controlled rectifier 70 has fired and there is a further indication of which phase of the system is responsible for the firing.

Each of the coils 92 to 95 of the status indicator devices also cooperate with suitable reset coils 100 to 103 (which correspond to reset coil 11 of FIG. 1) where the reset coils 100 to 103 are connected in parallel and are energized through the circuit including sensitivity control resistor 104, pushbutton switch 105, capacitor 106, current-limiting resistors 107 and 108 and diode 109. Thus, when an AC voltage is connected to the terminals 110 and 111 of the reset circuit, capacitor 106 is charged. Upon the momentary closing of switch 105, a reset current pulse will flow through reset coils 100 to 103, thereby to reset any or each of indicators 96 to 99.

Although this invention has been described with respect to preferred embodiments, it should be understood that many variations and modifications will now be obvious to those skilled in the art. Therefore, the scope of this invention is limited not by the specific disclosure herein, but only by the appended claims.

The embodiments of the invention in which an exclusive privilege or property is claimed are defined as follows:

1. An indicator circuit for indicating the conduction of a normally nonconductive semiconductor device; said indicator circuit including, in combination:
   a. a source of rectified DC voltage having first and second terminals which are respectively positive and negative;
   b. a semiconductor device operable between a conduction and nonconduction condition and normally being in said nonconduction condition;
   c. a load device connected in series with said voltage source and said semiconductor device;
   d. first and second diode means having respective first and second leads; said first leads connected to said first and second terminals, respectively, of said voltage source;
   e. an indicator device having an indicator means movable between first and second indicator positions, and a set coil and a reset coil coupled to said indicator means, whereby energization of said set coil and reset coil operates said indicator means between said first and second indicator positions;
   f. said second leads of said first and second diodes connected to one another and in series with said set coil and said semiconductor device, whereby conduction of said semiconductor device energizes said set coil; and
   g. reset circuit means connected to said reset coil; said reset circuit means including switch means, the operation of which energizes said reset coil.

2. The indicator circuit of claim 1 wherein said load device comprises trip circuit means and circuit interrupter means coupled to said voltage source and to said trip circuit means, whereby operation of said trip circuit means by conduction of said semiconductor device operates said circuit interrupter means.

3. The indicator circuit of claim 2 which includes energy storage means connected across said voltage source.

4. The indicator circuit of claim 3 wherein said semiconductor device comprises a controlled rectifier and wherein said energy storage means comprises a capacitor.

5. An indicator circuit for a multiphase circuit for indicating a fault condition on any of the phases of said circuit; each phase of said multiphase circuit including:
   a. output voltage means comprising a rectifier circuit having first and second DC terminals for generating an output voltage related to the current in its respective phase;
   b. a semiconductor device operable between a conduction and nonconduction condition and normally being in said nonconduction condition;
   c. a multiphase circuit interrupter connected to said multiphase circuit;
   d. a trip device connected to said interrupter and in series with said semiconductor device;
   e. respective first and second diode means for each of said phases and each having first and second leads connected to said first and second terminals of said output voltage means of their said respective phase;
   f. an indicator device for each of said phases; each of said indicator devices having an indicator means movable between first and second indicator positions, and a set coil and a reset coil coupled to said indicator means, whereby energization of said set coil and reset coil operates said indicator means between said first and second indicator positions;

g. said second leads of said first and second diodes connected to one another and in series with their respective set coil and said semiconductor device, whereby conduction of said semiconductor device energizes at least one of said set coils, depending on the magnitude of voltage of its respective output voltage means; and h. reset circuit means for each of said reset coils.

6. The indicator circuit of claim 5 which includes resistor means in series with each of said set coils.

7. The indicator circuit of claim 5 which includes energy storage means connected across each of said output voltage means.

8. The indicator circuit of claim 7 wherein said semiconductor device is a controlled rectifier and said energy storage means is a capacitor.